United States Patent
Mizuno et al.

(10) Patent No.: US 8,252,451 B2
(45) Date of Patent: Aug. 28, 2012

(54) BATTERY ELECTRODE AND BATTERY ELECTRODE MANUFACTURING METHOD

(75) Inventors: Fuminori Mizuno, Susono (JP); Shinji Nakanishi, Mishima (JP); Sanae Okazaki, Shizuoka-ken (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 426 days.

(21) Appl. No.: 12/588,160

(22) Filed: Oct. 6, 2009

(65) Prior Publication Data
US 2010/0086849 A1 Apr. 8, 2010

(30) Foreign Application Priority Data
Oct. 8, 2008 (JP) ................................. 2008-261646

(51) Int. Cl.
*H01M 2/16* (2006.01)
(52) U.S. Cl. ......... 429/145; 429/132; 429/209; 429/241
(58) Field of Classification Search .................. 429/132, 429/133, 134, 137, 145, 229, 231, 241
See application file for complete search history.

(56) References Cited

U.S. PATENT DOCUMENTS
2006/0051675 A1* 3/2006 Musha et al. ............ 429/231.95

FOREIGN PATENT DOCUMENTS

| EP | 1 289 036 A1 | 3/2003 |
|---|---|---|
| JP | A-62-136761 | 6/1987 |
| JP | A 7-320744 | 12/1995 |
| JP | A-11-111265 | 4/1999 |
| JP | A-11-345633 | 12/1999 |
| JP | A-2001-338655 | 12/2001 |
| JP | A-2006-019174 | 1/2006 |
| JP | A 2006-286414 | 10/2006 |
| JP | A-2008-066293 | 3/2008 |
| JP | A-2008-257928 | 10/2008 |

OTHER PUBLICATIONS

Feb. 15, 2011 Japanese Office Action (drafted Feb. 10, 2011) issued in JP-2008-261646 (with Translation).
Mar. 5, 2012 Office Action issued in Chinese Application No. 200910179031.7 (with translation).

* cited by examiner

*Primary Examiner* — Patrick Ryan
*Assistant Examiner* — Ben Lewis
(74) *Attorney, Agent, or Firm* — Oliff & Berridge, PLC

(57) ABSTRACT

The invention provides a battery electrode manufacturing method that includes a composition adjusting process of adjusting an electrode layer forming composition that includes a first electrode material having a particle size that is larger than an opening size of a porous collector, and a second electrode material having a particle size that is smaller than the opening size of the porous collector; and an application process of applying the electrode layer forming composition to the porous collector. The invention also provides a battery electrode having an inner electrode layer and an outer electrode layer.

6 Claims, 3 Drawing Sheets

SEM PHOTOGRAPH OF THE SURFACE OF THE CARBON PAPER

SEM PHOTOGRAPH OF THE SURFACE OF THE BATTERY ELECTRODE

SEM PHOTOGRAPH OF A CROSS-SECTION OF THE BATTERY ELECTRODE

BATTERY ELECTRODE AND BATTERY ELECTRODE MANUFACTURING METHOD

INCORPORATION BY REFERENCE

The disclosure of Japanese Patent Application No. 2008-261646 filed on Oct. 8, 2008 including the specification, drawings and abstract is incorporated herein by reference in its entirety.

BACKGROUND OF THE INVENTION

1. Field of the Invention

The invention relates to a battery electrode and a battery electrode manufacturing method in which an electrode layer having a multilayered structure can be easily formed.

2. Description of the Related Art

An electrode used in a chemical battery such as a metal-air battery, a lithium battery, and a fuel cell normally has a collector and an electrode layer formed on that collector. In recent years, attempts have been made to form the electrode layer with a multilayered structure in order to improve the performance of the battery electrode.

For example, Japanese Patent Application Publication No. 2006-286414 (JP-A-2006-286414) describes a positive electrode that is used in a nonaqueous electrolyte air battery and has two layers of different compositions. More specifically, JP-A-2006-286414 describes a positive electrode that has a layer which is able to reduce oxygen formed on the air hole side, and a layer which is able to store lithium ions formed on the negative electrode side. Also, in JP-A-2006-286414, various examples of methods for forming this kind of positive electrode are described, such as a forming two film-like layers and superposing these on the collector, or sequentially applying a composition that includes the components that form these layers.

Meanwhile, Japanese Patent Application Publication No. 7-320744 (JP-A-7-320744) describes an electrode that is used in a metal-air battery or a fuel cell and has an active layer that includes a catalyst and a water-repellent blocking layer. Also, JP-A-7-320744 describes a method for forming this kind of electrode that includes sequential deposition by filtering means using a dispersion fluid that includes the components that form the layers.

Both of the methods described in JP-A-2006-286414 and JP-A-7-320744 combine operations for forming single layers. As a result, there are a many manufacturing processes and the operation is complex.

SUMMARY OF THE INVENTION

In view of this, the invention thus provides a battery electrode and a battery electrode manufacturing method that enables an electrode layer having a multilayered structure to be easily formed.

Thus, a first aspect of the invention relates to a battery electrode manufacturing method that includes i) a composition adjusting process of adjusting an electrode layer forming composition that includes a first electrode material having a particle size that is larger than an opening size of a porous collector, and a second electrode material having a particle size that is smaller than the opening size of the porous collector, and ii) an application process of applying the electrode layer forming composition to the porous collector.

According to this battery electrode manufacturing method, using a combination of a porous collector and two or more kinds of electrode materials having different particle sizes enables an electrode layer having a multilayered structure to be easily formed. As a result, a battery electrode with excellent performance can easily be obtained.

Also, the first electrode material and the second electrode material may be different materials. This broadens the material selection, thus enabling a variety of battery electrodes with excellent performance to be obtained.

Also, the first electrode material may be at least one of a catalyst, conductive material, water-repellent material, active material, or a solid electrolyte, and the second electrode material may be at least one of a catalyst, conductive material, water-repellent material, active material, or a solid electrolyte. As a result, a variety of battery electrodes with excellent performance are able to be obtained.

Also, the material of the porous collector may be metallic material or carbon material because they both have excellent electron conductivity.

Also, the battery electrode may be an electrode for a metal-air battery. This enables the capacity to be increased compared with a lithium battery.

Also, the first electrode material may be a catalyst, the second electrode material may be conductive material, and the porous collector may be a collector using carbon material. As a result, an air electrode with excellent power generating efficiency can be obtained.

Another aspect of the invention relates to a battery electrode that includes i) a porous collector, ii) an inner electrode layer that includes a second electrode material that is formed in the surface of the porous collector and has a particle size that is smaller than an opening size of the porous collector, and iii) an outer electrode layer that includes a first electrode material that is formed on the inner electrode layer and has a particle size that is larger than the opening size of the porous collector.

According to the battery electrode described above, providing the inner electrode layer formed in the collector and the outer electrode layer formed on the outside of the collector results in a battery electrode with excellent performance.

Accordingly, the invention makes it possible to obtain a battery electrode and a battery electrode manufacturing method that enables an electrode layer having a multilayered structure to be easily formed.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

A battery electrode and a battery electrode manufacturing method of the invention will now be described in greater detail. First, the battery electrode manufacturing method of the invention will be described. The battery electrode manufacturing method of the invention includes i) a composition adjusting process of adjusting the electrode layer forming composition including a first electrode material having a particle size that is larger than the opening size of a porous collector and a second electrode material having a particle size that is smaller than the opening size of the porous collector, and ii) an applying process of applying the electrode layer forming composition to the porous collector.

According to the invention, the porous collector is used in combination with two or more kinds of electrode materials having different particle sizes, thus enabling an electrode layer having a multilayered structure to be easily formed. As a result, a battery electrode with excellent performance is able to be easily obtained. Also, the manufacturing process is streamlined which improves manufacturing efficiency and reduces costs.

Figure 1A:
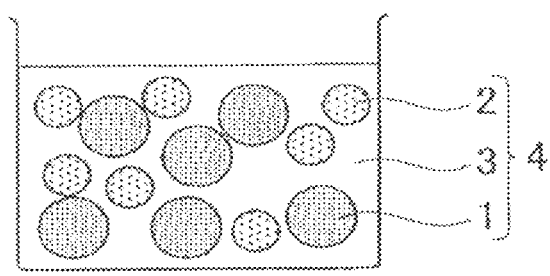
FIGS. 1A, 1B, and 1C are sectional views schematically showing an example of a battery electrode manufacturing method of the invention.
Figure 1B:
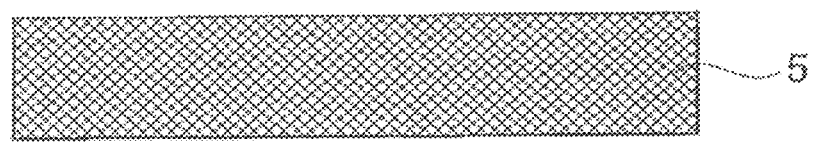
Figure 1C:
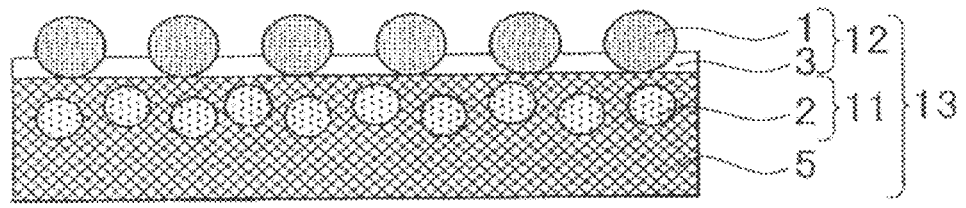

FIGS. 1A to 1C are sectional views schematically showing an example of the battery electrode manufacturing method of the invention. In the battery electrode manufacturing method illustrated in FIGS. 1A to 1C, an electrode layer forming composition 4 that includes i) a first electrode material having a particle size that is larger than the opening size of a porous collector, ii) a second electrode material 2 having a particle size that is smaller than the opening size of the porous collector, and a iii) binder 3 that is dispersed and dissolved in a solvent, is adjusted as shown in FIG. 1A. Then the electrode layer forming composition 4 is applied to the surface of a porous collector 5, as shown in FIG. 1B. As a result, a battery electrode 13 that includes i) the porous collector 5, ii) an inner electrode layer 11 that is formed in the surface of the porous collector 5 and includes the second electrode material 2 and a binder, not shown, and iii) an outer electrode layer 12 that is formed on the inner electrode layer 11 and includes the first electrode material 1 and the binder 3 is able to be obtained as shown in FIG. 1C.

Next, the relationships between the particle size of the first electrode material, the particle size of the second electrode material, and the opening size of the porous collector in the invention will be described. In the invention, the opening size of the porous collector is defined as follows. That is, the opening size of the porous collector in the invention is a bottleneck diameter in which the cumulative filter flow is 90% based on the. bubble point method (ASTMF 316-86, JISK 3832) and the half-dry method (ASTME 1294-89). Incidentally, the bottleneck radial distribution of the porous collector may be measured using a Perm Porometer (manufactured by PMI). Although the opening size of the porous collector is not particularly limited as long as it is smaller than the particle size of the first electrode material and larger than the particle size of the second electrode material, it is preferably within a range of 1 μm to 50 μm, and more preferably within a range of 5 μm to 30 μm, for example.

Also, in the invention, the particle size of the first electrode material is defined as follows. That is, in order to measure particle size distribution of the electrode material, a particle size distribution measurement is taken and the value at d50 is set as the particle size of the first electrode material of the invention. The particle size of the first electrode material is typically larger than the opening size of the porous collector, with the difference between the particle size of the first electrode material and the opening size of the porous collector being preferably 1 μm or larger, and more preferably, within a range of 5 μm to 25 μm, for example. Also, the particle size of the first electrode material is preferably within a range of 10 μm to 100 μm, and more preferably, within a range of 5 μm to 25 μm, for example.

Further, in the invention, particle size of the second electrode material may be defined by the same method as the first electrode material described above. The particle size of the second electrode material is typically smaller than the opening size of the porous collector, with the difference between the opening size of the porous collector and the particle size of the second electrode material being preferably 1 μm or larger, and more preferably, within a range of 5 μm to 20 μm, for example. Also, the particle size of the second electrode material is preferably within a range of 0.01 μm to 10 μm, and more preferably, within a range of 0.1 μm to 10 μm, for example. Hereinafter, each process of the battery electrode manufacturing method of the invention will be described.

First, the composition adjusting process of the invention will be described. The composition adjusting process of the invention is a process for adjusting the electrode layer forming composition that includes the first electrode material having a particle size that is larger than the opening size of the porous collector, and the second electrode material having a particle size that is smaller than the opening size of the porous collector. The electrode layer forming composition may be able to be obtained by mixing the electrode materials and the like.

(1) Electrode Layer Forming Composition

As described above, the electrode layer forming composition of the invention includes at least the first electrode material and the second electrode material. Incidentally, in the invention, two or more types of electrode materials may be used for both the first electrode material and the second electrode material. Also, the electrode layer forming composition preferably includes a binder in order to improve the adhesion of the electrode material. Furthermore, the electrode layer forming composition may also include a solvent when necessary. Adding a solvent improves the dispersibility of the electrode material and the like, as well as makes it easier to adjust the viscosity of the composition.

Some examples of the first electrode material and the second electrode material include a catalyst, conductive material, water-repellent material, active material, and a solid electrolyte. Specific examples and combinations of these materials will be described in detail later in "(2) First and second electrode material combinations." Also, the content of the first electrode material and the content of the second electrode material in the electrode layer forming composition may be set as appropriate according to the target battery electrode.

Also, although binder used in the invention is not particularly limited as long as it is able to fix the electrode material, it is preferably a very chemically stable binder so that it can inhibit deterioration of the electrode layer from the electrode reaction. Examples of such a binder include fluoride binders such as polyvinylidene-difluoride (PVDF), polyvinylidene-difluoride-hexafluoropropylene (PVDF-HFP), and polytetrafluoroethylene (PTFE). There need only be enough binder in the electrode layer forming composition to securely adhere the electrode material. Preferably less binder is better.

Moreover, although the solvent used in the invention is not particularly limited as long as it is able to disperse the electrode material and the binder, it is preferably highly volatile. Some examples of this solvent include acetone, N-methyl-2-pyrolidone (NMP), N,N-dimethylacetamide (DMA), N,N-dimethylformamide (DMF), methyl ethyl ketone (MEK), and tetrahydrofuran (THF).

The solid content concentration of the electrode layer forming composition of the invention may be set as appropriate according to the amount of the second electrode material that penetrates into the porous collector. Typically, a lower solid content concentration of the electrode layer forming composition enables the second electrode material to penetrate deeper into the porous collector. The solid content concentration of the electrode layer forming composition is preferably within a range of 5% to 50%, and more preferably, within a range of 10% to 20%, for example. Incidentally, the solid content concentration may be calculated according to the expression below. Solid content concentration (%) of electrode layer forming composition=(composition concentration after drying in an Argon atmosphere for 1 hour at 80° C.)/(composition concentration before drying)×100

(2) First and Second Electrode Material Combinations

Next, the combinations of the first electrode material and the second electrode material of the invention will be described. In the invention, the first and second electrode materials may be the same material or different materials. When the first and second electrode materials are the same material, the battery electrode may be manufactured using electrode materials in which only the particle size is different. On the other hand, when the first and second electrode materials are different materials, the materials may have the same function or different functions. One example of a case in which the different materials have the same function is when the first electrode material is a catalyst and the second electrode material is a catalyst of a material that is different from the material of the catalyst of the first electrode material. On the other hand, one example of a case in which the different materials have different functions is when the first electrode material is a catalyst and the second electrode material is conductive material.

Also, the battery electrode obtained from the invention may be used in a chemical battery, for example. Some examples of chemical batteries include a metal-air battery, a lithium battery, and a fuel cell. Hereinafter, combinations of the electrode materials will be described for each type of battery.

First, a case in which an electrode for a metal-air battery is obtained will be described. In this case, the invention enables an air electrode or a negative electrode for a metal-air battery to be obtained. Some examples of electrode material include in the electrode layer of an air electrode are a catalyst, conductive material, and water-repellent material. Incidentally, the catalyst may be carried on conductive material. Also, a solid electrolyte may also be used when the battery is an all-solid-state battery. Some examples of the catalyst include manganese dioxide and cobalt phthalocyanine. Some examples of the conductive material include mesoporous carbon, graphite, acetylene black, carbon nanotube, and carbon fiber. Some examples of the solid electrolyte include a polymer electrolyte and an inorganic solid electrolyte. One example of the water-repellent material is a water-repellent polymer. Moreover, a specific example of this water-repellent polymer is a FAS (fluoro-alkyl silane) water-repellent polymer.

In the invention, the electrode materials in the electrode layers of the air electrode may be combined as appropriate. Some examples of electrode material combinations include i) a combination in which a catalyst is used as the first electrode material and conductive material is used as the second electrode material, ii) a combination in which a catalyst is used as the first electrode material and catalyst carrying conductive material is used as the second electrode material, iii) a combination in which a solid electrolyte is used as the first electrode material and catalyst carrying conductive material is used as the second electrode material, and iv) a combination in which catalyst carrying conductive material is used as the first electrode material and water-repellent material is used as the second electrode material.

Meanwhile, some examples of electrode material in the electrode layer of the negative electrode of the metal-air battery include negative-electrode active material and conductive material. Also, a solid electrolyte may also be used when the battery is an all-solid-state battery. The negative-electrode active material is not particularly limited as long as it is able to store and/or release metal ions. Some examples of the negative-electrode active material used in a lithium-air battery include lithium metal, a lithium alloy, lithium oxide, and lithium nitride. Incidentally, the conductive material is the same as that in the air electrode described above.

In the invention, the electrode materials in the electrode layer of the negative electrode of a metal-air battery may be combined as appropriate. One example electrode material combination in this case is a combination in which a solid electrolyte is used as the first electrode material and negative-electrode active material is used as the second electrode material.

Also, there are various types of metal-air batteries, some examples of which are a lithium-air battery, a sodium-air battery, a potassium-air battery, a magnesium-air battery, a calcium-air battery, a zinc-air battery, an aluminum-air battery, and an iron-air battery. Of these, the lithium-air battery, the sodium-air battery, and the potassium-air battery are preferable, the lithium-air battery being more preferable. Also, the metal-air battery may be a primary battery or a secondary battery.

Next, a case in which an electrode of a lithium battery is obtained will be described. In this case, the invention enables a positive electrode or a negative electrode of a lithium battery to be obtained. Some examples of the electrode material in the electrode layer of the positive electrode include positive-electrode active material and conductive material. Also, a solid electrolyte may also be used when the battery is an all-solid-state battery. Some examples of the positive-electrode active material include $LiCoO_2$, $LiMn_2O_4$, $LiNiO_2$, $LiNi_{0.5}Mn_{1.5}O_4$, $LiNi_{1/3}Mn_{1/3}Co_{1/3}O_2$, $LiNi_{0.5}Mn_{0.5}O_2$, $LiCoPO_4$, $LiFePO_4$, and $LiMnPO_4$. Incidentally, the conductive material and the solid electrolyte are the same as they are in the metal-air battery described above.

In the invention, the electrode materials in the electrode layer of the positive electrode of the lithium battery may be combined as appropriate. Some examples of electrode material combinations in this case include a combination in which a solid electrolyte is used as the first electrode material and positive-electrode active material is used as the second electrode material, and a combination in which both positive-electrode active material and conductive material are used for both the first electrode material and the second electrode material.

Meanwhile, some examples of the electrode material in the electrode layer of the negative electrode of a lithium battery include negative-electrode active material and conductive material. A solid electrolyte may also be used when the battery is an all-solid-state battery. The negative-electrode active material is not particularly limited as long as it is able to store and/or release lithium ions. Some examples of the negative-electrode active material include metal active material and carbon active material. Some examples of metal active material include In, Al, Si, and Sn. Meanwhile, some examples of carbon active material include mesocarbon microbead (MCMB), highly oriented pyrolytic graphite (HOPG), hard carbon, and soft carbon. Incidentally, the conductive material and the solid electrolyte are the same as they are in the metal-air battery described above.

In the invention, the electrode materials in the electrode layer of the negative electrode of a lithium battery may be combined as appropriate. Some example electrode material combinations in this case include a combination in which a solid electrolyte is used as the first electrode material and negative-electrode active material and conductive material are used as the second electrode material, and a combination in which both negative-electrode material and conductive material are used for both the first electrode material and the second electrode material.

Next, a case in which an electrode of a fuel cell is obtained will be described. In this case, the invention enables an electrode (an anode electrode or a cathode electrode) of a fuel cell to be obtained. Some examples of the electrode material in the electrode layer of the fuel cell include a catalyst and conductive material. Incidentally, the catalyst may be carried on conductive material. Some examples of this catalyst include Pt, Pd, Rh, iron porphyrin, and $La_{0.8}Sr_{0.2}MnO_3$. Also, the electrode layer forming composition may include an electrolyte material represented by a perfluorosulfonic acid type polymer. Incidentally, the conductive material is the same as it is in the metal-air battery described above. Also, in the invention, the electrode materials in the electrode layer of the fuel cell may be combined as appropriate.

Next, the application process of the invention will be described. The application process of the invention is a process of applying the electrode layer forming composition to the porous collector. Incidentally, the opening size and the like of the porous collector is as described above.

The porous collector used in the invention is not particularly limited as long as it has the desired electron conductivity and is porous enough to allow the second electrode material to penetrate it. Of these, the porous collector is preferably able to diffuse gas, which makes it useful as an air electrode collector of a metal-air battery or a gas diffuser (collector) of a fuel cell.

Some examples of the structure of the porous collector include a mesh structure in which constituent fibers are arranged in an orderly fashion, a non-woven structure in which the constituent fibers are randomly arranged, and a three-dimensional network having independent pores or communicating pores. Of these, a non-woven structure or a three-dimensional network is preferable because it enables the second electrode material to be retained inside the collector.

Also, although the porosity of the porous collector is not particularly limited, it is preferably within a range of 20% to 99%, for example.

Also, some examples of the material of the porous collector include metallic material, carbon material, and high electron conducting ceramic material. Some examples of metallic material include stainless steel, nickel, aluminum, iron, titanium, and copper. Also, an example of carbon material is carbon fiber. An example of a high electron conducting ceramic material is titanium nitride (TiN).

A specific example of a porous collector using metallic material is metal mesh. Also, specific examples of a porous collector using carbon material include carbon cloth (which corresponds to the mesh structure described above) and carbon paper (which corresponds to the non-woven structure described above). Also, an example of a porous collector using high electron conducting ceramic material is titanium nitride (TiN) that has a three-dimensional network.

In particular, when manufacturing an air electrode for a metal-air battery in the invention, the porous collector is preferably a collector using carbon material. This is because a strong alkaline metallic oxide $M_2O_2$ (where M is a metallic element such as Li) produced by a discharge reaction is able to inhibit the porous collector from eluting or leaching out. As a result, the discharge capacity retention rate can be increased.

Also, the thickness of the porous collector is preferably within a range of 10 μm to 1,000 μm, and more preferably, within a range of 20 μm to 400 μm, for example.

In the invention, the electrode layer forming composition is applied to the surface of the porous collector. The method by which the electrode layer forming composition is applied is not particularly limited. For example, a typical application method such as the doctor blade method may be used. Moreover, in the invention, the electrode layer forming composition is preferably dried to remove the solvent after being applied.

Next, the battery electrode of the invention will be described. The battery electrode of the invention includes i) a porous collector, ii) an inner electrode layer that is formed in the surface of the porous collector and includes a second electrode material that has a particle size that is smaller than the opening size of the porous collector, and iii) an outer electrode layer that is formed on the inner electrode layer includes a first electrode material that has a particle size that is larger than the opening size of the porous collector.

According to the invention, providing the inner electrode layer that is formed on the inner portion of the collector and the outer electrode layer that is formed on the outer portion of the collector result in a battery electrode with excellent performance.

FIG. 1C is a sectional view schematically showing one example of a battery electrode of the invention. The battery electrode 13 shown in FIG. 1C includes i) a porous collector 5, ii) an inner electrode layer 11 that is formed in the surface of the porous collector 5 and includes a second electrode material 2 and a binder, not shown, and iii) an outer electrode layer 12 that is formed on the inner electrode layer 11 and includes a first electrode material 1 and a binder 3.

Incidentally, the details of the porous collector, the first electrode material, the second electrode material, and the binder in the invention, as well as the use of the battery electrode of the invention, are the same as those described above and will therefore be omitted here.

The inner electrode layer in the invention is a layer that is formed in the surface of the porous collector and includes at least the second electrode material. Incidentally, the inner electrode layer may include two or more types of the second electrode material. Although the content of the second electrode material in the inner electrode layer is not particularly limited, it is preferably within a range of 10 wt % to 90 wt %, for example. Further, the inner electrode layer also preferably includes a binder to improve adherence between the second electrode material and the surface of the collector. There need only be enough binder in the inner electrode layer to securely adhere the second electrode material. Preferably less binder is better. Also, the thickness of the inner electrode layer differs depending on the use of the battery electrode, but is preferably within a range of 10 μm to 500 μm, for example.

The outer electrode layer in the invention is a layer that is formed on the inner electrode layer and includes at least the first electrode material. Incidentally, the outer electrode layer may include two or more types of the first electrode material. Although the content of the first electrode material in the outer electrode layer is not particularly limited, it is preferably within a range of 10 wt % to 90 wt %, for example. Further, the outer electrode layer also preferably includes a binder to improve adherence between the first electrode material and the surface of the inner electrode layer. There need only be enough binder in the outer electrode layer to securely adhere the first electrode material. Preferably less binder is better. Also, the thickness of the outer electrode layer differs depending on the use of the battery electrode, but is preferably within a range of 10 μm to 200 μm, for example.

Also, the invention is also able to provide a chemical battery that uses the battery electrode described above. Some examples of a chemical battery include a metal-air battery, a lithium battery, and a fuel cell.

Incidentally, the invention is not limited to the example embodiment described above. Any and all example embodiments that have substantially the same structure and technical features described in the scope of the claims of the invention and which display similar operation and effects are intended to be included within the technical scope of the invention.

An example embodiment will now describe the invention in greater detail. Carbon black ($d_{50}$=5.0 μm), $MnO_2$ catalyst ($d_{50}$=15 μm), and PVDF-HFP (polyvinylidene-difluoride-hexafluoropropylene) binder were weighed so that the weight ratio was 25:42:33 and then mixed together. Then this mixture was mixed and agitated (at 2,000 rpm for 30 minutes) together with acetone to obtain an electrode layer forming composition.

Next, carbon paper (manufactured by Toray; TGP-H-090, 0.28 mm thickness) having an opening size of 8 μm was prepared as the electrode collector. The electrode layer forming composition described above was then applied with a doctor blade to this carbon paper. Next, the electrode layer forming composition on the carbon paper was dried for 1 hour at 80° C. in an Argon atmosphere, and then vacuum dried for 24 hours at 60° C. to obtain a battery electrode.

Figure 2A:
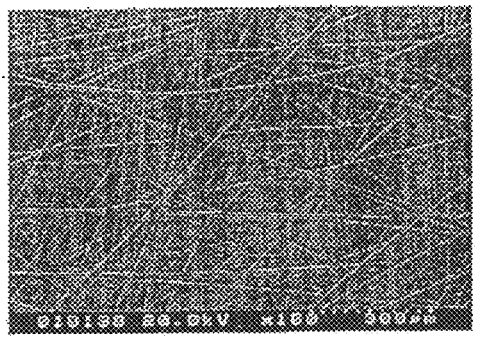
FIGS. 2A, 2B, and 2C are views of the results of SEM observation of a battery electrode obtained with an example embodiment and carbon paper used in the example embodiment.
Figure 2B:
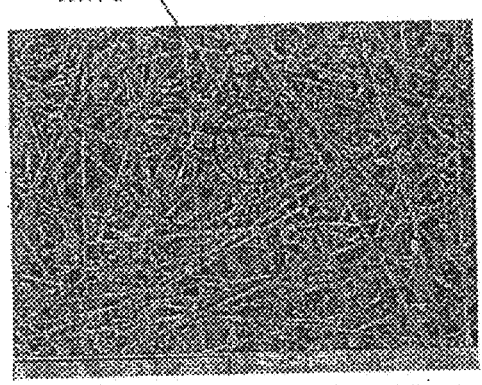
Figure 2C:
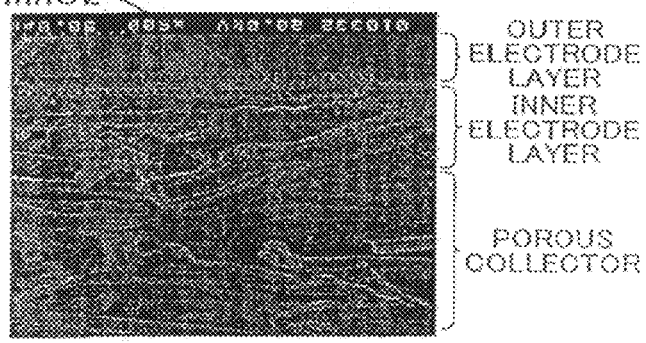

The carbon paper used in the example embodiment and the battery electrode obtained by the example embodiment were observed using a scanning electron microscope (SEM). FIGS. 2A to 2C show the results. FIG. 2A is a photograph of the surface of the carbon paper. This photograph confirms that the carbon fibers are randomly arranged. Also, FIG. 2B is a photograph of the surface of the battery electrode obtained by the example embodiment. This photograph confirms that there is a large particle size $MnO_2$ catalyst on the surface of the carbon paper. Also, FIG. 2C is a photograph of a cross-section of the battery electrode obtained by the example embodiment. This photograph confirms that there is small particle size carbon black inside of the carbon paper. In this way, it was confirmed that an electrode layer having a multi-layered structure can easily be formed by a single application.

Figure 3A:
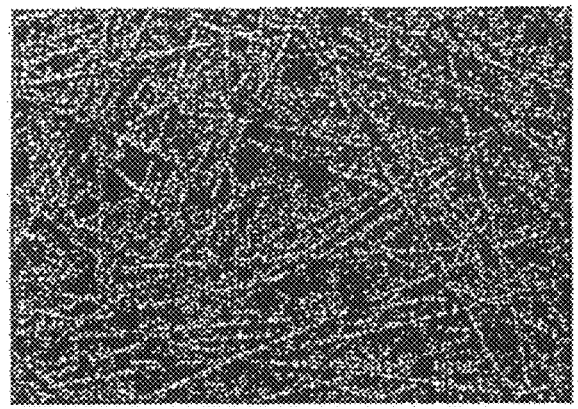
FIGS. 3A, 3B, and 3C are views of the results of EDX analysis of the battery electrode obtained with the example embodiment.
Figure 3B:
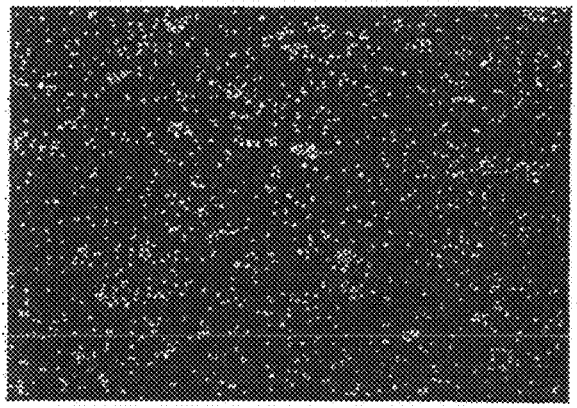
Figure 3C:
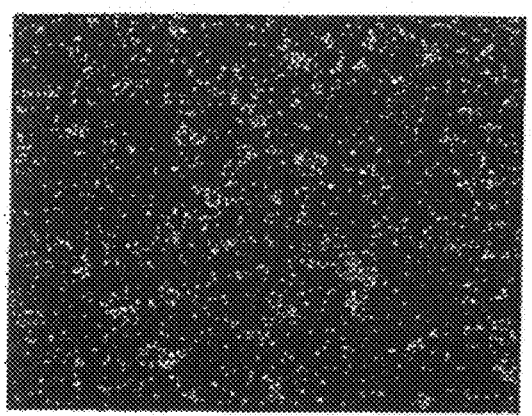

Further, energy-dispersive X-ray (EDX) analysis was performed on the battery electrode obtained by the example embodiment. FIGS. 3A to 3C show the results. FIGS. 3A to 3C are photographs of the surface that show the presence of the element carbon (C), the element oxygen (O), and the element manganese (Mn), respectively. In particular, the positions of the element oxygen and the element manganese match, as shown in FIGS. 3B and 3C, which confirms that the particles on the outer surface of the carbon paper are the $MnO_2$ catalyst particles.

What is claimed is:

1. A battery electrode manufacturing method, comprising:
    a composition preparing process of preparing an electrode layer forming composition that contains a first electrode material having a particle size that is larger than an opening size of a porous collector, and a second electrode material having a particle size that is smaller than the opening size of the porous collector; and
    an application process of applying the electrode layer forming composition to the porous collector.

2. The battery electrode manufacturing method according to claim 1, wherein the first electrode material and the second electrode material are different materials.

3. The battery electrode manufacturing method according to claim 1, wherein each of the first electrode material and the second electrode material is a catalyst, conductive material, water-repellent material, active material, or a solid electrolyte.

4. The battery electrode manufacturing method according to claim 1, wherein material of the porous collector is metallic material or carbon material.

5. The battery electrode manufacturing method according to claim 1, wherein the battery electrode is an electrode for a metal-air battery.

6. The battery electrode manufacturing method according to claim 5, wherein the first electrode material is a catalyst, the second electrode material is conductive material, and the porous collector is a collector using carbon material.

* * * * *